United States Patent [19]
Dow et al.

[11] Patent Number: 5,373,909
[45] Date of Patent: Dec. 20, 1994

[54] TRACKED VEHICLES AND POWER DRIVE APPARATUS FOR MOTIVATING TRACKED VEHICLES

[75] Inventors: Paul W. Dow; Steven S. Dow, both of Byron, N.Y.

[73] Assignee: Byron Enterprises, Inc., Byron, N.Y.

[21] Appl. No.: 143,556

[22] Filed: Oct. 26, 1993

[51] Int. Cl.⁵ .............................................. B62D 55/00
[52] U.S. Cl. ...................................... 180/9.1; 180/235; 305/21; 305/28
[58] Field of Search .................. 180/9.1, 9.42, 9.44, 180/9.62, 235; 305/21, 22, 24, 28, 35 R, 35 EB

[56] References Cited

U.S. PATENT DOCUMENTS

| | | | |
|---|---|---|---|
| 2,426,816 | 9/1947 | Busque | 180/9.62 |
| 3,382,943 | 5/1968 | Anderson | 305/35 R |
| 3,435,908 | 4/1969 | Sunderlin | 180/9.44 |
| 3,447,619 | 6/1969 | Nodwell | 180/9.46 |
| 3,741,331 | 6/1973 | Kowalik | 180/9.44 |
| 3,789,942 | 2/1974 | Kowalik | 180/9.44 |
| 3,888,132 | 6/1975 | Russ, Sr. | 305/35 EB |
| 3,937,289 | 2/1976 | Dickinson | 180/9.44 |
| 4,072,203 | 2/1978 | Pierson | 180/9.44 |
| 5,176,573 | 1/1993 | Dow | 460/42 |

OTHER PUBLICATIONS

"Radial Bearings, Type SF" in catalog SPHERICAL PLAIN BEARINGS, published by The Torrington Co., Inc., 59 Field St., Torrington, Conn. 06790.

*Primary Examiner*—Eric D. Culbreth
*Assistant Examiner*—Victor E. Johnson
*Attorney, Agent, or Firm*—M. Lukacher

[57] ABSTRACT

An articulated tracked vehicle for agricultural harvesting which reduces damage to fields and can be driven on paved roads at reasonable speeds. The vehicle has front and rear elements, linked by an articulating joint which permits turning and rotation of one element with respect to the other. Each element is motivated by a pair of tracked power units which are hydraulically driven by a heavy duty differential between the units. Each power unit is rotatably mounted solely on a shaft sleeve of the differential and is free to oscillate vertically and independently to absorb irregularities in its path. Each unit includes an endless elastomeric track which has two rows of lugs on its inner surface. A novel drive mechanism engages these lugs to motivate the vehicle. A sealed transmission housing in each power unit protects key drive elements from environmental damage without interfering with operation of the unit. The transmission is centrally disposed within each power unit to provide further protection from damage.

9 Claims, 13 Drawing Sheets

TRACKED VEHICLES AND POWER DRIVE APPARATUS FOR MOTIVATING TRACKED VEHICLES

FIELD OF THE INVENTION

The invention relates to tracked vehicles, and more particularly to power drive apparatus for tracked vehicles, which may have front and rear driven sections with an articulated connection for coupling and steering the vehicles, and which may be hydraulically powered. The present invention is especially useful in providing power units for supporting or motivating agricultural harvesting apparatus such as heads and threshers which pick the crop. Power units have sometimes been called tractors.

BACKGROUND OF THE INVENTION

Off-road vehicles are commonly equipped with endless tracks rather than tires. Tracks have been found to be more useful than tires in rough or marshy terrain, in that they are less prone to stress-induced failures and to becoming bogged down. Tracks are desirable because they spread their load (several thousand pounds for large agricultural power drives) over a larger surface area than do tires for similar loads, so that the tracked vehicles do not sink into the ground. For this reason, tracked power drive vehicles have become widespread in off-road applications such as construction, the military, recreational vehicles, snow grooming, and some tracked vehicles have been used in agricultural harvesting. See, for example, U.S. Pat. No. 5,176,573 issued to Paul Dow on Jan. 5, 1993.

Tracked vehicles commonly employ endless linked steel belts as tracks. These steel tracks are usually cleated on the outside to improve traction. Steering is commonly accomplished by immobilizing one of the tracks and driving the other, causing the vehicle to pivot on its stationary track. This maneuver requires high horsepower and also does significant damage to the surface beneath the vehicle. Therefore, steel-tracked vehicles are generally prohibited on paved roadways and must be transported over the road on flatbed trucks.

Agricultural harvesters are used in plowed fields and even during wet weather; then, tracks are superior to tires for traction. An added advantage of tracks is that they do less damage to the soil by way of compaction and rutting. Recently, tracks made of elastomeric materials such as rubber or plastic have become available as alternatives to steel tracks. In agricultural harvesting, for example, rubber tracked vehicles can be driven in the fields without significant damage to the soil and then be driven over paved roads from field to field. It is a feature of the invention to provide improved tracked vehicles which can travel over the road, and at reasonable speeds.

Tracked vehicles are known to be powered hydraulically, as disclosed in, for example, U.S. Pat. No. 3,447,619. A common drive utilizes a low-speed high-torque (LSHT) hydraulic motor. Such drives are powerful but are incapable of road speeds above about 15 miles per hour, whereas many portions of the harvesting industry depend upon a road speed of 20 miles per hour or higher to meet the demands of the harvesting schedule. Other drives use high-speed hydraulic motors with gear reduction, but these are bulky, costly, and subject to high maintenance.

A common means of driving a rubber track is by forming a drive wheel within the power unit as essentially a sprocket and engaging the teeth of the sprocket with holes formed in the track. This design has the drawback that the sprocket teeth protrude through the rubber track and can dig up the field and, more seriously, do damage to paved roadway.

Off-road tracked vehicles must handle rough, rocky terrain without conventional ride-softening suspension elements such as springs and shock-absorbers, which would interfere with precise location of the picking and threshing mechanisms with respect to the crop and with respect to each other. Track designs which have heretofore been proposed include designs which ride very roughly over objects in their path. The track assembly must ride up on the object, reach its balance point, and then fall forward, with no means within the action of the track to absorb the shock of encountering the obstacle.

A drawback of conventional two-track vehicles resides in the long length of track required to support the vehicle. This exacerbates the aforementioned steering difficulty and surface damage. While four-track vehicles having a two-part articulated chassis have been proposed, for example, in U.S. Pat. Nos. 3,435,908; 3,741,331; 3,789,942; 3,937,289; and 4,072,203, they have not been suitable for heavy loads as required for agricultural harvesting applications. It is a feature of the invention to provide improved power drives which enable four-track vehicles to haul heavy loads over rough terrain and with positional stability needed to locate harvesting heads and threshing components with respect to the ground and to each other.

An additional drawback of conventional four-track vehicles is the need to limit the freedom of articulation of the joint between front and rear elements to left and right horizontally. This limits the ability of the vehicle to adapt to irregular terrain. This is because vertical rigidity must be maintained between the two elements, particularly in designs in which independent vertical oscillation of each of the four power units is permitted. Without vertical rigidity, the articulating joint is vertically unstable in such conventional two-track vehicles. For this reason, a simple ball-joint connection cannot be used. It is a feature of the invention to provide a joint for an articulated tracked vehicle which permits both horizontal (left and right) and rotational (about a longitudinal axis through the rear element) relative motion of the front and rear elements, while maintaining vertical rigidity between the elements.

Track drive units commonly are designed with rugged drive elements such as sprockets and chains which are exposed for easy repair and maintenance, which has the drawback of making these elements vulnerable to damage. It is a feature of this invention to provide a power unit for a tracked vehicle wherein the drive elements are encased and located, within the unit for maximum protection of the elements, but in a way which does not interfere with operation and which still permits ready access for repairs and maintenance.

SUMMARY OF THE INVENTION

The invention provides an improved hydraulically powered tracked power unit adapted for use on a tracked vehicle, and preferably on an articulated tracked vehicle. An articulated tracked vehicle in accordance with the invention may have two pairs of such power units.

More particularly, a power unit, which is provided in accordance with an embodiment of the invention, is driven by a chain-drive transmission, housed in a rugged, rigid sealed housing, which is also the primary structural element of the power unit. The housing is rotatably mounted on a fixed sleeve of a differential on the vehicle, allowing the power unit to pivot vertically about a horizontal axis in response to encountering an object in its path. This response, which is analogous to the spring and shock absorber action in a wheeled vehicle, minimizes the vertical displacement of the axis. The transmission drives a member which comprises both a road wheel and track drive sprocket, which sprocket engages lugs formed on the inner surface of an endless track and motivates the track thereby transmitting motive power to the ground beneath the power unit.

Preferably, the chain drive transmission and its housing are located along the longitudinal centerline of the power unit to remove them as far as possible from hazards to either the left or right of the track.

The power unit may further comprise idler road wheels also within the track; a pair of oscillating idler bogies to aid in absorbing protrusions above the surface of the road; and a device to maintain proper tension in the endless track.

An articulated tracked vehicle of the invention has a front and a rear chassis, connected by an articulating joint and adapted to be steered by means of functionally-opposed hydraulic cylinders to the left and right of the articulating joint, whereby the front chassis can be turned either left or right with respect to the rear chassis. Additionally, in a preferred embodiment, the articulating joint comprises three spherical bearings and a rotating link, the arrangement of which also permits longitudinal relative rotation of the front chassis with respect to the rear chassis while maintaining vertical rigidity of the joint.

Each chassis further comprises a rigidly-mounted hydraulically-powered differential unit having a rugged, sealed housing comparable in strength to that of the power unit transmission housing. Two power units are each rotatably disposed on the shaft sleeves of the two output power shafts of the differential which extend in opposite directions from the differential. The two power units are thereby free to oscillate vertically with respect to the chassis and to each other. The articulated vehicle, comprising two chassis and four independent power units, can operate over very rough terrain with extreme stability and minimum vertical selective displacement.

The vehicle may be powered by an engine mounted on one of the chassis. An equipment module which may include harvesting or threshing devices can be carried by the other chassis. The engine drives a master hydraulic pump system, which in turn powers two independent hydraulic drive elements, disc brakes for the front and rear differential units, and the hydraulic steering cylinders.

DETAILED DESCRIPTION OF THE INVENTION

Figure 1:
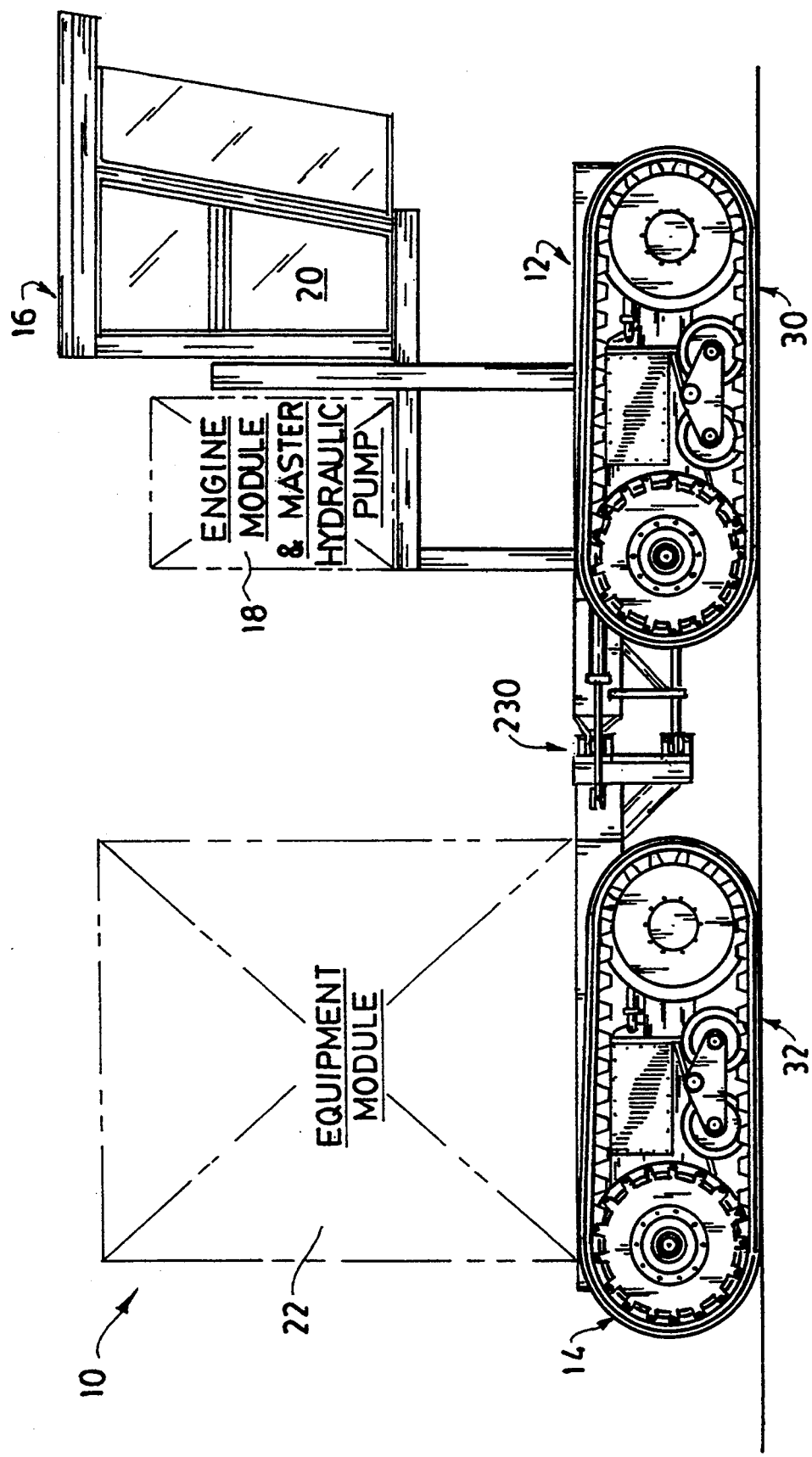
FIG. 1 is a side elevation of an articulated tracked vehicle according to the invention, where the equipment and motors are shown schematically.

Referring to the figures, wherein like numbers are given to like elements in the different drawings, in FIG. 1 is shown an articulated tracked vehicle 10 in accordance with the invention. The vehicle has a front driven element 12 and a rear driven element 14 which are substantially identical mechanically. Front element 12 carries a superstructure 16 comprising an engine module 18 which includes a master hydraulic pump, both shown schematically, and which powers both elements 12 and 14 of vehicle 10. Superstructure 16 also includes an operator compartment 20 for control of the driving functions of the vehicle and the equipment functions of the equipment module 22 carried by rear element 14. Alternatively, superstructure 16 can be sized or positioned on front element 12 such that some elements of equipment module 22 can be borne by front element 12. Front element 12 and rear element 14 can be the same or different in length, width, and height.

In a preferred embodiment, front and rear elements 12 and 14 are coupled by an articulating joint 230, as shown variously in FIGS. 1, 2, 3, 12, 13 and 14. Shown are three substantially identical spherical bearing units: upper 232, lower rear 252, and lower forward 272. These three bearing units are coplanar in a vertical plane containing the longitudinal axis of vehicle 10 when vehicle 10 is on level ground. Commercially-available bearing units, such as Torrington 22 SF-36 Spherical Bearings, available from The Torrington Co., Torrington, Conn., are suitable for this purpose.

Bearing unit 232 is mounted in the flanges of upper bearing mount 234 on rear chassis 34'. Bearing unit 252 is mounted in the flanges of rear chassis lower bearing mount 254 directly below and co-linear with bearing unit 232. The race of bearing unit 232 is connected to front chassis 34 by bearing mount 236. Bearing 272 is mounted on front chassis 34 in the flanges of lower forward bearing mount 274, directly forward of bearing unit 252. The races of bearing unit 252 and 272 are connected by rotatable link 262, said link thereby being allowed to rotate about its longitudinal axis in response to rotation of front element 12 relative to rear element 14.

Figure 3:
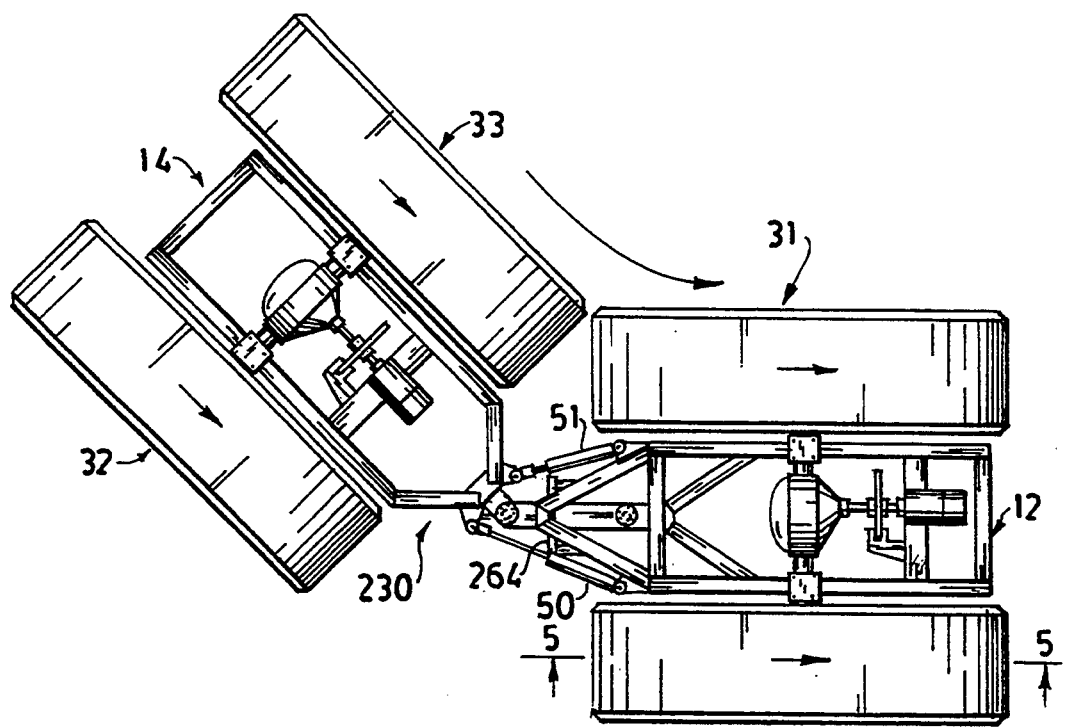
FIG. 3 is a top view like FIG. 2 with the vehicle of FIG. 2 in a turning mode.

In operation, bearings 232 and 252 constitute a vertical hinge, allowing front element 12 to turn left or right relative to rear element 14 as shown in FIG. 3. Additionally, the three spherical bearings 232, 252, 272, and rotatable link 262 cooperate to allow longitudinal rotation of front element 12 relative to rear element 14 while maintaining vertical rigidity of articulating joint 230. The longitudinal axis of the vehicle can bend only left or right, never up or down. Rotation of link 262 is limited by rotation limiting plate 264 to 15° from horizontal, either clockwise or counterclockwise.

Figure 14:
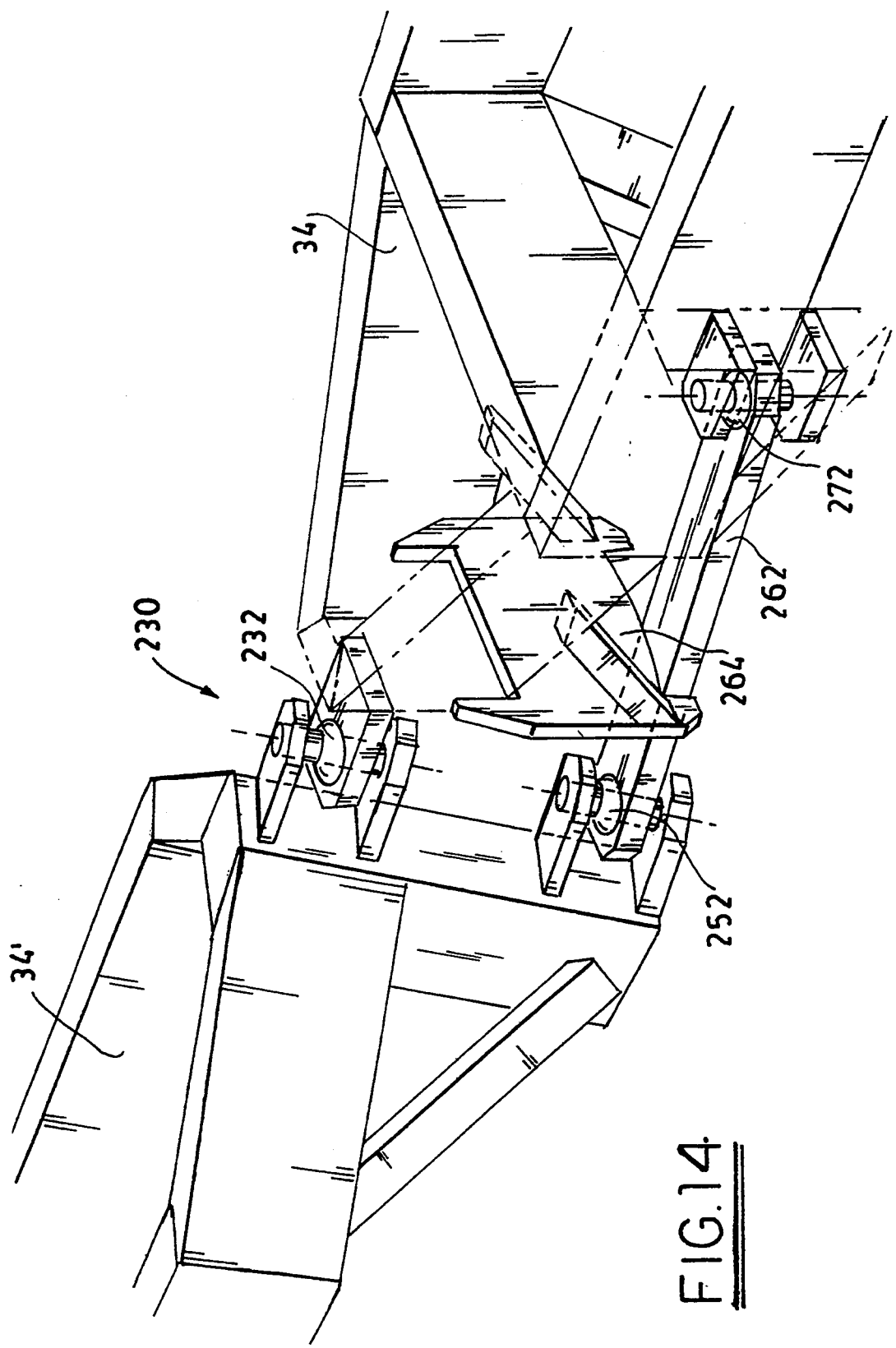
FIG. 14 is an isometric view of the articulating joint of FIGS. 12 and 13, showing the joint in articulation and the limitation of rotation of one chassis with respect to the other imposed by the rotation limiting plate.

FIG. 14 shows the relationship of rotatable link 262 to rotation limiting plate 264. This limitation is necessary to prevent damage to bearings 232, 252 and 272.

Alternatively, front and rear elements 12 and 14 can be coupled by mounting a vertical hinge (not shown) in place of bearings 232 and 252, and by eliminating bearing 272 and fixedly connecting link 262 to front chassis 34. This hinge arrangement provides full freedom of motion laterally for steering and is rigid vertically, but does not permit rotation of one chassis element with respect to the other.

Also shown in FIG. 1 are right side front and rear tracked power units 30 and 32, respectively, the construction and operation of which is described herebelow.

Figure 2:
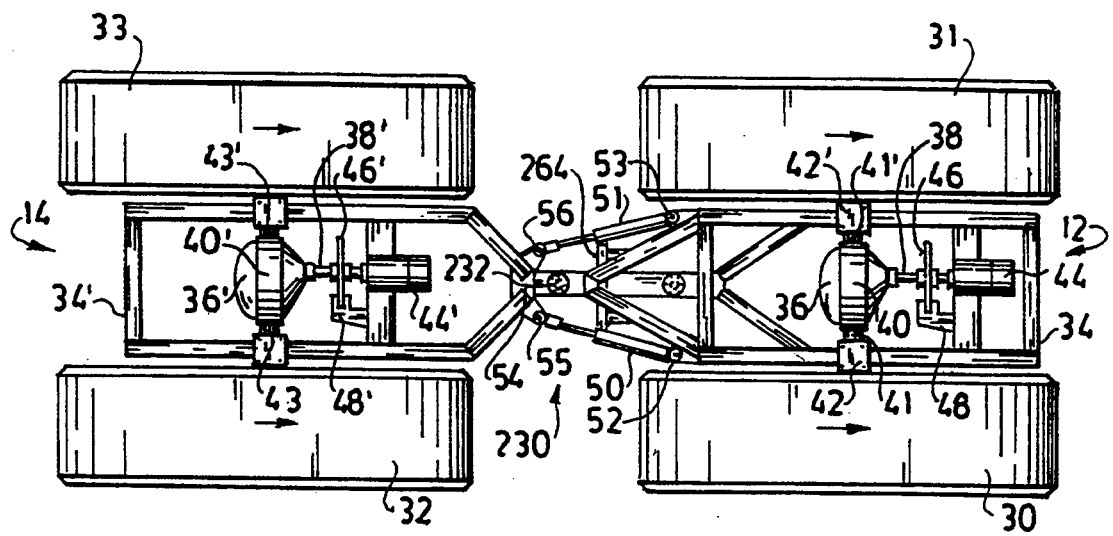
FIG. 2 is a top view of the vehicle of FIG. 1 with the superstructure removed.

FIG. 2 is a top view of the vehicle in FIG. 1 with the superstructure removed for clarity of presentation, showing the close similarity in design between the front and rear driven elements 12 and 14. FIG. 2 shows the general layout of the vehicle comprising front right and left tracked power units 30 and 31 on front element 12, and rear right and left power units 32 and 33 on rear element 14.

Front element 12 includes a structural chassis 34. Front differential 36 is a conventional, heavy duty differential having a power input shaft 38 and two diametrically opposed power output shafts 39 and 39' (not visible in FIG. 2). The housing 40 of differential 36 is strong enough to withstand the torsional loads exerted on it by the attachment and action of the power units as is described herebelow.

Power output shafts 39 and 39' are carried in fixed sleeves 41 and 41', respectively, which are integral with differential housing 40 and are rigidly attached to the underside of chassis 34 by clamps 42 and 42', respectively.

Power input shaft 38 is connected to a variable displacement hydraulic motor 44 which is rigidly mounted on chassis 34 and is supplied with high-pressure hydraulic fluid from the master hydraulic pump (means not shown). Fixed on power input shaft 38 is disc 46 which cooperates with chassis-mounted caliper 48 as a disc braking system for front element 12. Caliper 48 is also hydraulically supplied by the master hydraulic pump. Braking is accomplished by de-powering of the differential hydraulic drive motor and/or pressurizing of the hydraulic brake caliper.

The design and operation of rear driven element 14 is virtually identical with that of front element 12. The analogous parts are rear structural chassis 34'; rear differential 36'; rear differential power input shaft 38'; rear differential housing 40'; rear differential fixed sleeves 43 and 43'; rear variable displacement hydraulic motor 44'; rear brake disc 46'; and rear brake caliper 48'.

Figure 13:
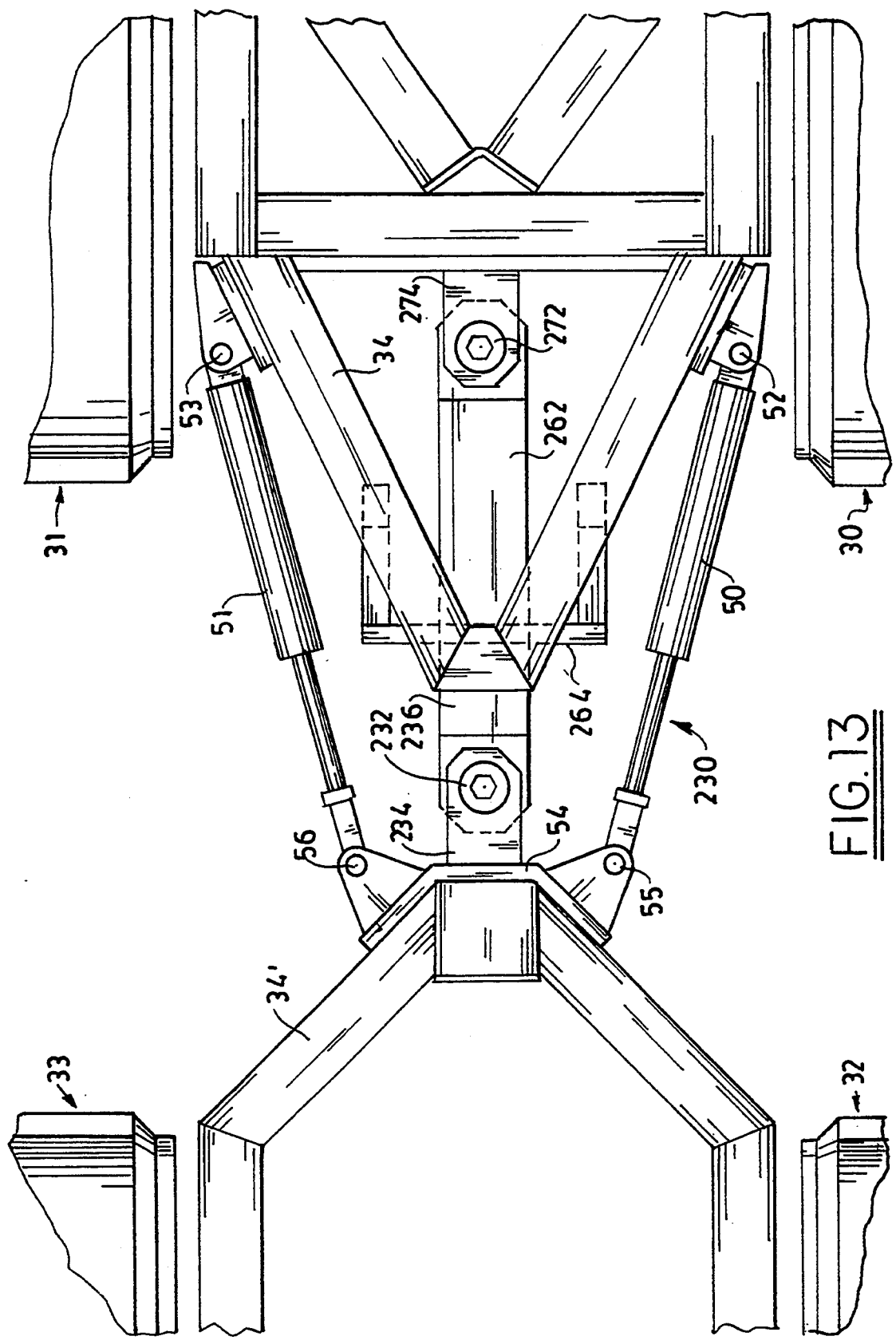
FIG. 13 is an enlarged view of the central area of FIG. 2, showing details of the articulating joint.

FIGS. 2 and 13 also show the layout of the steering mechanism. Right and left double-action hydraulic steering cylinders 50 and 51 are connected at their forward ends to front chassis 34 on opposite sides of articulating joint 230 by ball joints 52 and 53, respectively, and at their rear ends to yoke 54 by ball joints 55 and 56, respectively. Yoke 54 is a rigid member on rear chassis 34'.

The vehicle is turned, or steered, as is shown in FIG. 3. Right steering cylinder 50 is extended while left steering cylinder 51 is simultaneously retracted, causing front element 12 to turn to the left with respect to rear element 14. Rear element 14 will follow front element 12 on nearly the same track. The front and rear differentials permit the right side power units 30 and 32 to turn faster than the left side power units 31 and 33, thereby turning the vehicle in an arc to the left with minimal added horsepower required and with minimal scrubbing and damage to the surface under the tracks. Turning to the right is accomplished by reversing the actions of steering cylinders 50 and 51. Ball joints 52, 53, 55 and 56 are designed and placed such that even at maximum stroke of the cylinders there is no interference between the tracks of the power units on the front and rear chassis.

Figure 4:
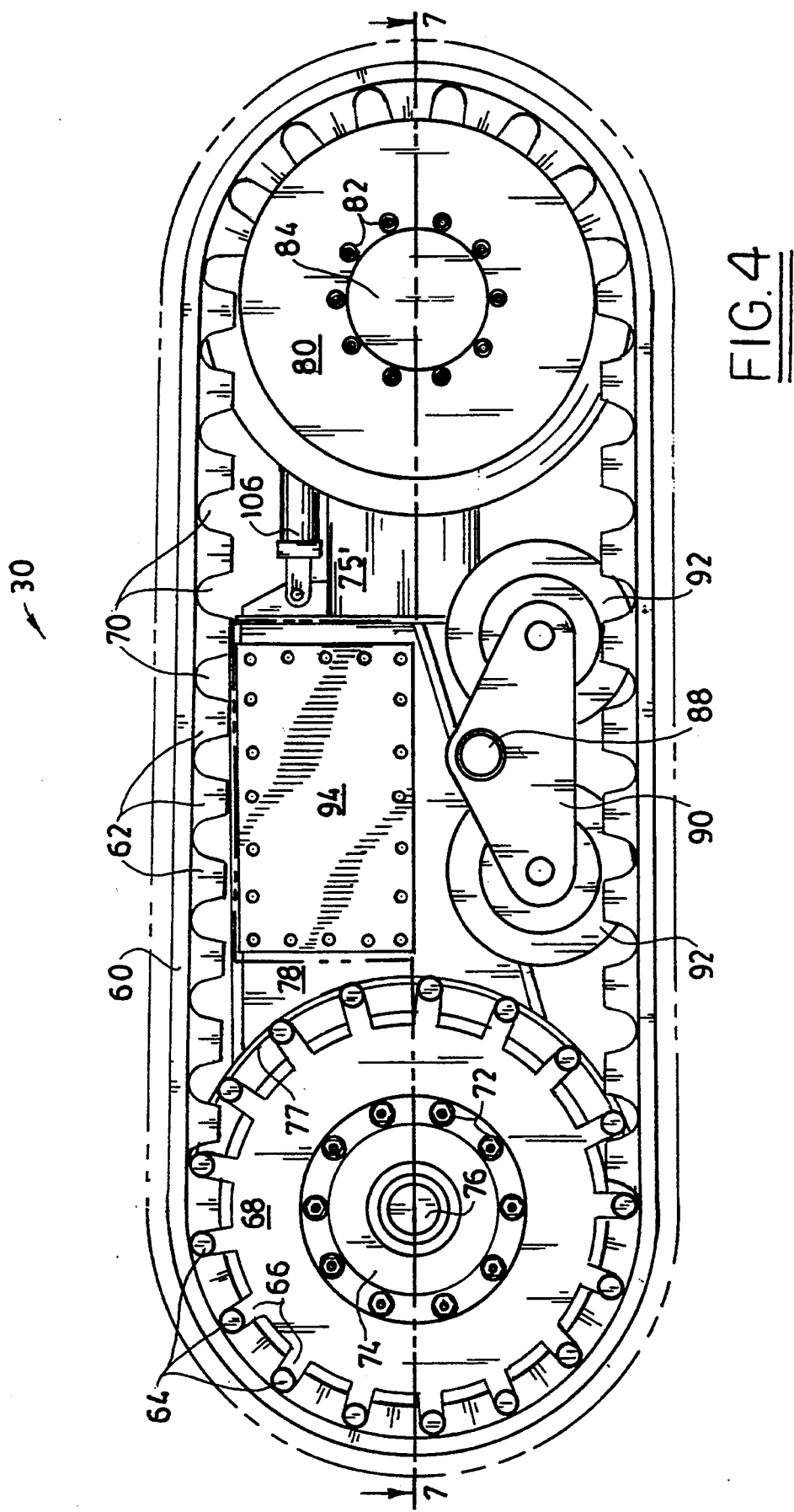
FIG. 4 is an enlarged side elevation of one of the typical tracked power units of the vehicle of FIG. 1.

FIG. 4 is an enlarged side elevation of right side tracked power unit 30 of vehicle 10. A sealed structural housing 78 is shown which protects drive elements within it as well as being the principal structural member of power unit 30. Rotating axle 76, connected to the drive within housing 78, protrudes through both sides of housing 78. A telescoping structural member 75 (not visible in FIG. 4) is disposed in a fixed member 75' on the forward end of housing 78 to carry an idler fixed axle 86 (not visible in FIG. 4.) A bogie fixed axle 88 is disposed on the underside of structural housing 78. Outer track drive sprocket 68 is affixed by nuts and bolts 72 to a stepped hub 74 mounted on rotating axle 76. Endless track 60 is shown with outboard drive lugs 62 affixed to its inner surface and engaging with outer drive bars 64 affixed to the tips of spaced teeth 66 of track drive sprocket 68 near the rear end of power unit 30. Lugs 62 have rounded valleys 70 between them, such that the valleys fit snugly around bars 64 and the lugs fit snugly between spaced teeth 66 when the track is travelling around drive sprocket 68. Bars 64 are also further affixed laterally to a smooth outer drive wheel 77 which is sized to fit snugly against the inner surface of endless track 60 inboard of lugs 62.

FIG. 4 also shows outer idler wheel 80 near the front end of power unit 30. Outer idler wheel 80 is affixed by bolts 82 to outer hub 84 which rotates on idler fixed axle 86 (not visible in FIG. 4). Outer idler wheel 80 is bevelled around its circumference and is sized to fit snugly against the inner surface of endless track 60 inboard of outboard drive lugs 62. The arrangement of idler wheels is shown in more detail in FIGS. 7 and 10.

An outer bogie, comprising a swing arm 90 carrying two outer bogie wheels 92, is mounted on bogie fixed axle 88. Outer bogie wheels 92 are aligned longitudinally with outer drive wheel 77 and with outer idler wheel 80. Swing arm 90 is free to oscillate about fixed axle 88 in response to protrusions in the road under the track, thereby providing firm yet resilient support for track 60. This greatly reduces the undesirable characteristic of formerly-proposed track designs which force the entire vehicle to ride unforgivingly up and over such protrusions. The arrangement of the bogie is shown in greater detail in FIGS. 6, 7 and 9.

FIG. 4 also shows an access panel 94 on the outside of housing 78 whereby drive components within housing 78 are easily reached for assembly, repair, or maintenance.

FIG. 4 also shows part of the mechanism for maintaining tension in endless track 60, including hydraulic tensioning cylinder 106. This mechanism is shown more clearly in FIGS. 5 and 6.

Figure 5:
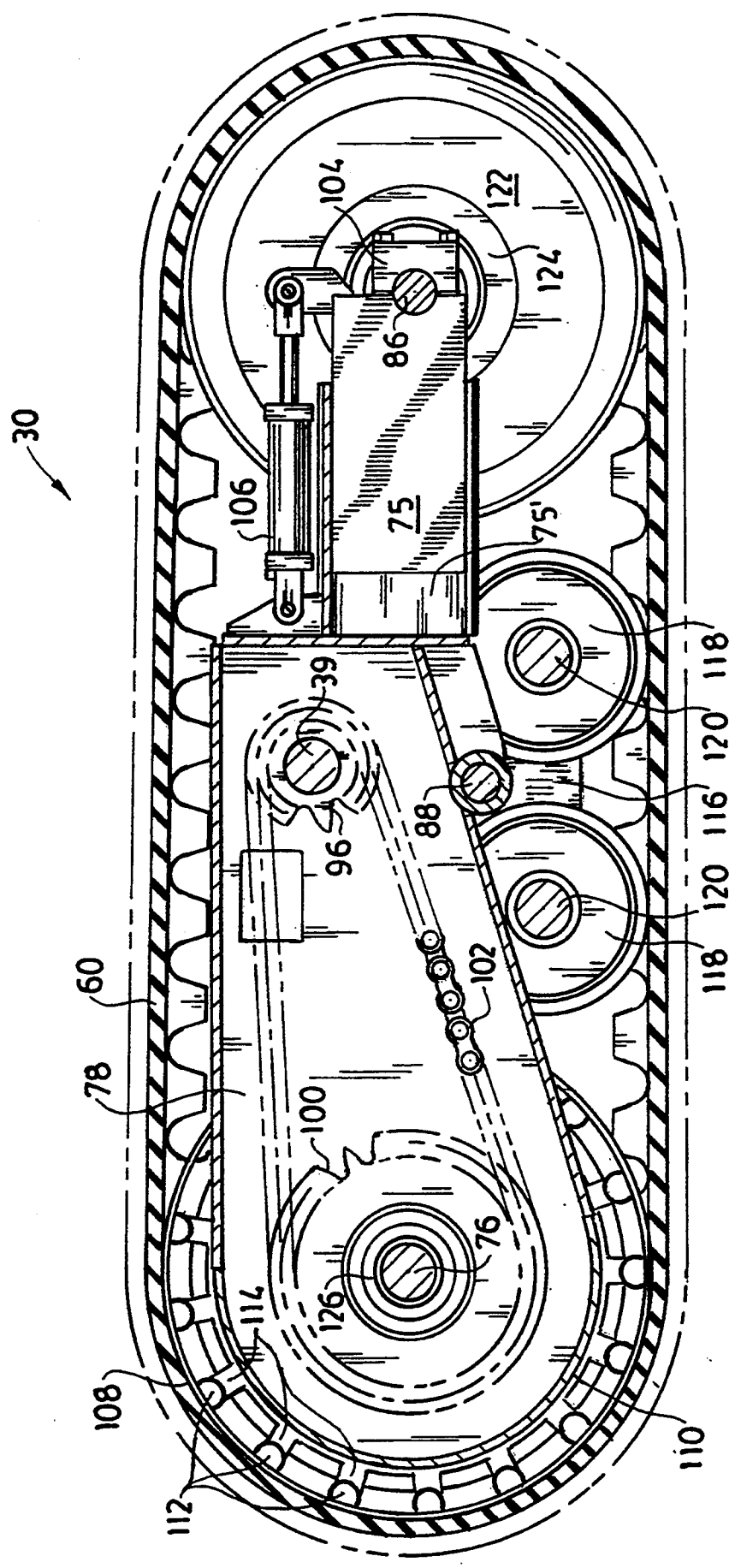
FIG. 5 is a sectional view taken along line 5—5 in FIG. 3 and FIG. 6, approximately middleway of the width of the track.

FIG. 5 shows elements of a chain-drive transmission, tensioning mechanism, and conveyance. Since FIG. 5 is a sectional view through power unit 30, it shows elements inboard of housing 78 not visible in previous figures.

Differential output shaft 39 extends through the inner sidewall of housing 78 and is fitted on its end with transmission drive sprocket 96. Rotating axle 76 is carried in bearings 126 mounted with seals in the sidewall of housing 78, as is shown in detail in FIG. 8. Driven transmission sprocket 100 is fixed on axle 76. Roller drive chain 102 is disposed about drive sprocket 96 and driven sprocket 100. Sealed housing 78 also serves as an oil bath, allowing the chain and sprockets to be bathed in oil continuously during operation.

Power unit 30 is substantially symmetrical about a longitudinal axis through housing 78. Thus the outer conveyance elements described in FIG. 4 have mirror image inner counterparts. Shown in FIG. 5 are an inner drive wheel 108, an inner track drive sprocket 110 carrying inner drive bars 112 affixed to sprocket teeth 114 and to inner drive wheel 108. An inner bogie assembly comprising inner bogie swing arm 116, inner bogie wheels 118, and inner bogie wheel axles 120 is shown disposed on the inner end of bogie fixed axle 88. An inner idler wheel 122 and its hub 124 are shown disposed on the inner portion of axle 86.

As noted previously, idler fixed axle 86 is mounted at the forward end of telescoping structural member 75, and is retained there by clamp 104. Telescoping member 75 moves within a fixed outer member 75' rigidly attached to housing 78. Hydraulic tensioning cylinder 106 is connected by shackles to housing 78 at its rear end and to telescoping member 75 at its forward end. Cylinder 106 is controllably supplied with high pressure hydraulic fluid (not shown), whereby axle 86 is urged away from axle 76 to maintain proper tension in endless track 60.

Figure 6:
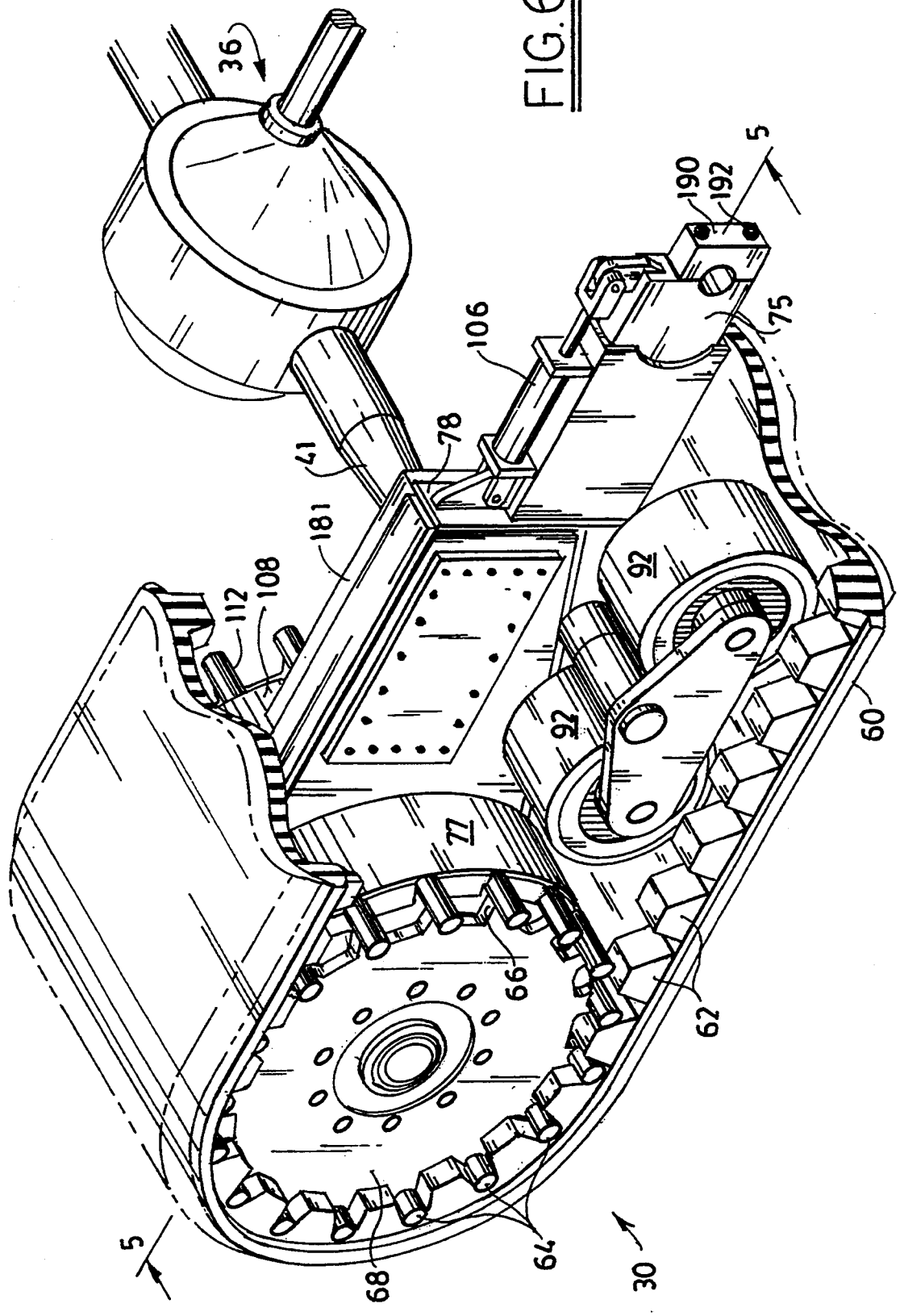
FIG. 6 is a fragmentary perspective view, partially in section, of the power unit shown in FIGS. 4 and 5.

FIG. 6 is a fragmentary perspective view, partially in section, of a portion of power unit 30, showing the longitudinal symmetry of the power unit about housing 78 and its relationship to differential 36 and fixed sleeve 41.

FIG. 6 also shows the design of the inner surface of endless track 60 and how it relates to a portion of the drive and conveyance elements described in FIGS. 4 and 5. Outer drive lugs 62 are formed in a row along the outer edge of the inner surface of track 60. The purpose of lugs 62 is to mesh with drive bars 64 and teeth 66 on track drive sprocket 68. A mirror image inner row of lugs 164 (not shown in FIG. 6) is formed on track 60 to mesh with the counterpart inner drive elements previously described. The load bearing conveyance elements comprising outer and inner drive wheels 77 and 108, outer and inner bogie wheels 92 and 118 (not shown), and outer and inner idler wheels 80 and 122 (neither shown) run against the inner surface of track 60 between the two rows of lugs, thereby distributing the vertical load onto the track and providing lateral stability for the track lugs against the sides of these elements.

Figure 7:
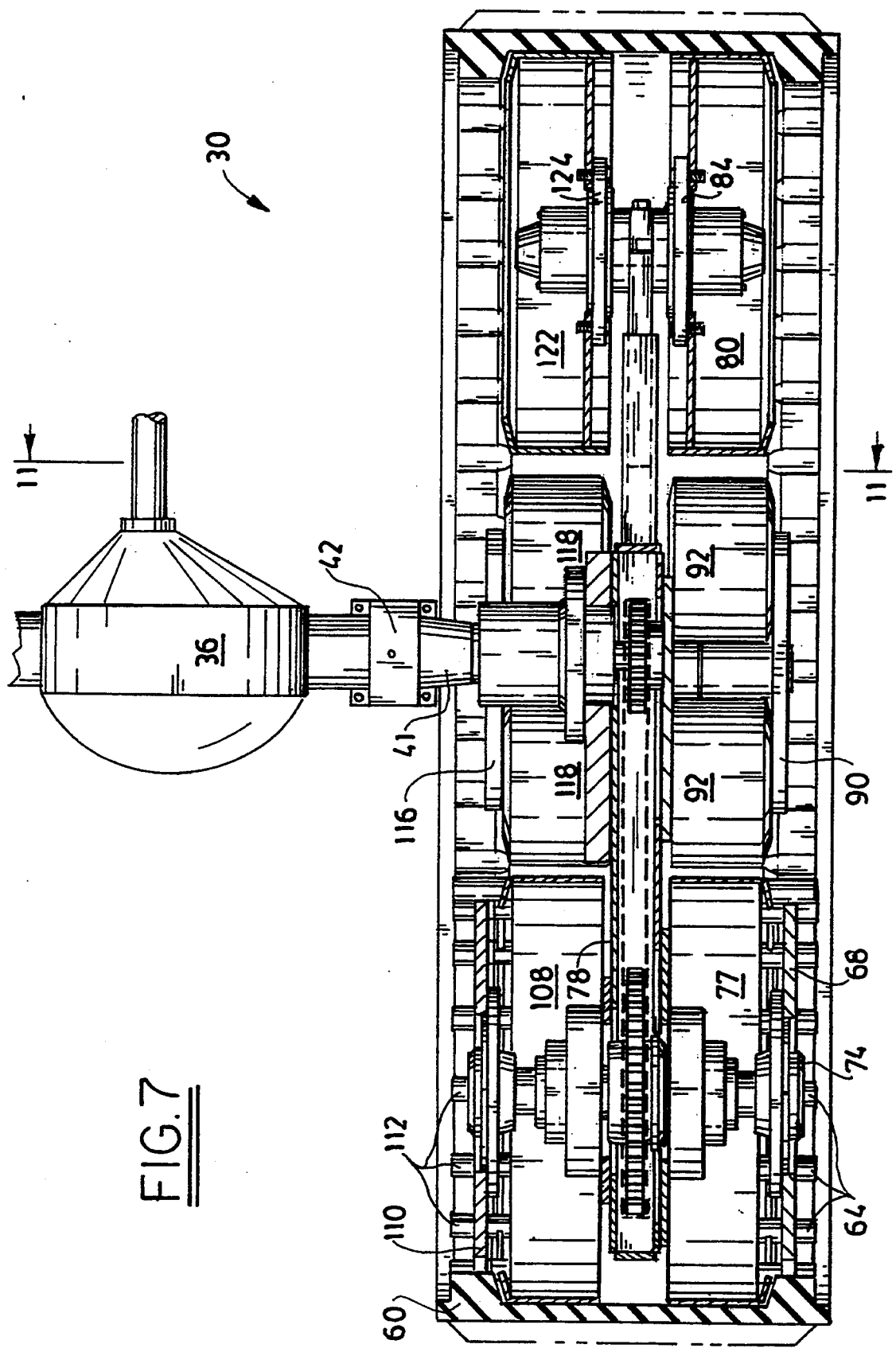
FIG. 7 is a sectional view taken along line 7—7 in FIG. 4.

FIG. 7 is a horizontal sectional view of power unit 30 showing the relationship of inner and outer drive and conveyance elements to the structural housing and to the inner surface of the track. It also shows the relationship of the differential and its fixed sleeve to the structural housing. For clarity of presentation, the power unit elements in FIG. 7 are described in greater detail in FIGS. 8, 9, and 10.

Figure 8:
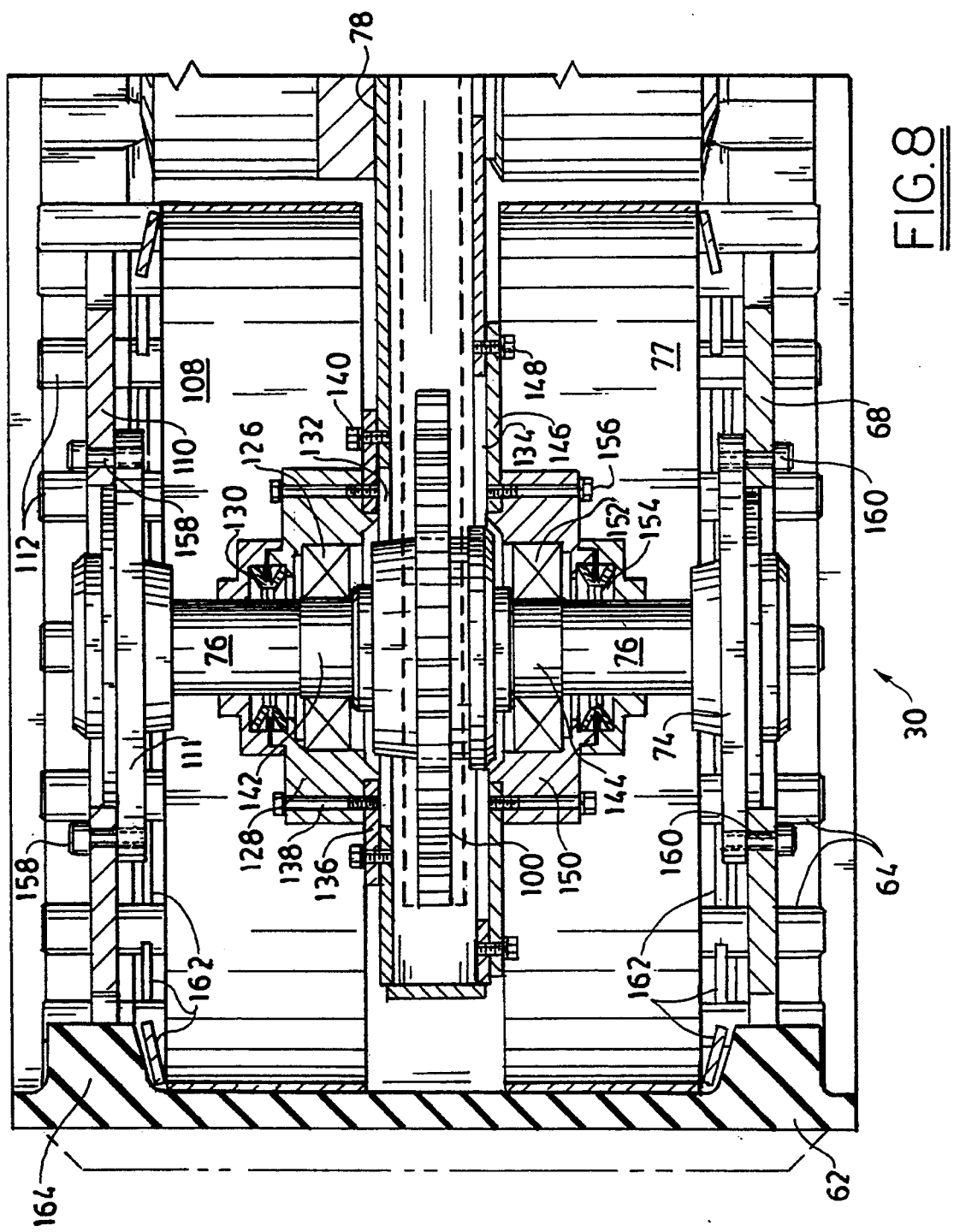
FIG. 8 is a view like FIG. 7, enlarged to show the rear of the unit, including the driven sprocket and drive wheels, in greater detail than in FIG. 7.

FIG. 8 shows details of the bearings and seals which permit axle 76 to rotate through sealed housing 78. The assembly is designed to have the inner bearings and seals installed prior to installation of the axle and transmission drive sprocket.

Inner bearing 126 is pressed into inner bearing retainer 128 which also comprises inner shaft face seal 130. The openings in the inner and outer walls of housing 78 are sized for insertion of inner bearing retainer 128 from the outside of power unit 30. Retainer 128 is secured to inner retainer ring 136 by bolts 138, and ring 136 is secured to housing 78 by bolts 140. Rotating axle 76 comprising inner and outer bearing lands 142 and 144 and having been previously fitted with driven sprocket 100 is inserted through inner bearing 126. Outer bearing retainer ring 146 is secured to the outer wall of housing 78 by bolts 148. Outer bearing retainer 150 comprising outer bearing 152 and outer shaft face seal 154 is secured to retainer ring 146 by bolts 156. The hub 111 for inner track drive sprocket 110 is mounted onto the inner end of axle 76, and the assembly of drive sprocket 110 and drive wheel 108 is secured to hub 111 by bolts 158. Similarly, the hub 74 for outer track drive sprocket 68 is mounted on the outer end of axle 76, and the assembly of sprocket 68 and drive wheel 77 is secured to hub 74 by bolts 160.

FIG. 8 also shows outwardly flared flanges 162 at the outer rim of outer drive wheel 77 and the inner rim of inner drive wheel 108. These flanges alternate with drive bars 64 and 112, and provide lateral stability of the drive wheels between outer drive lugs 62 and inner drive lugs 164.

Figure 9:
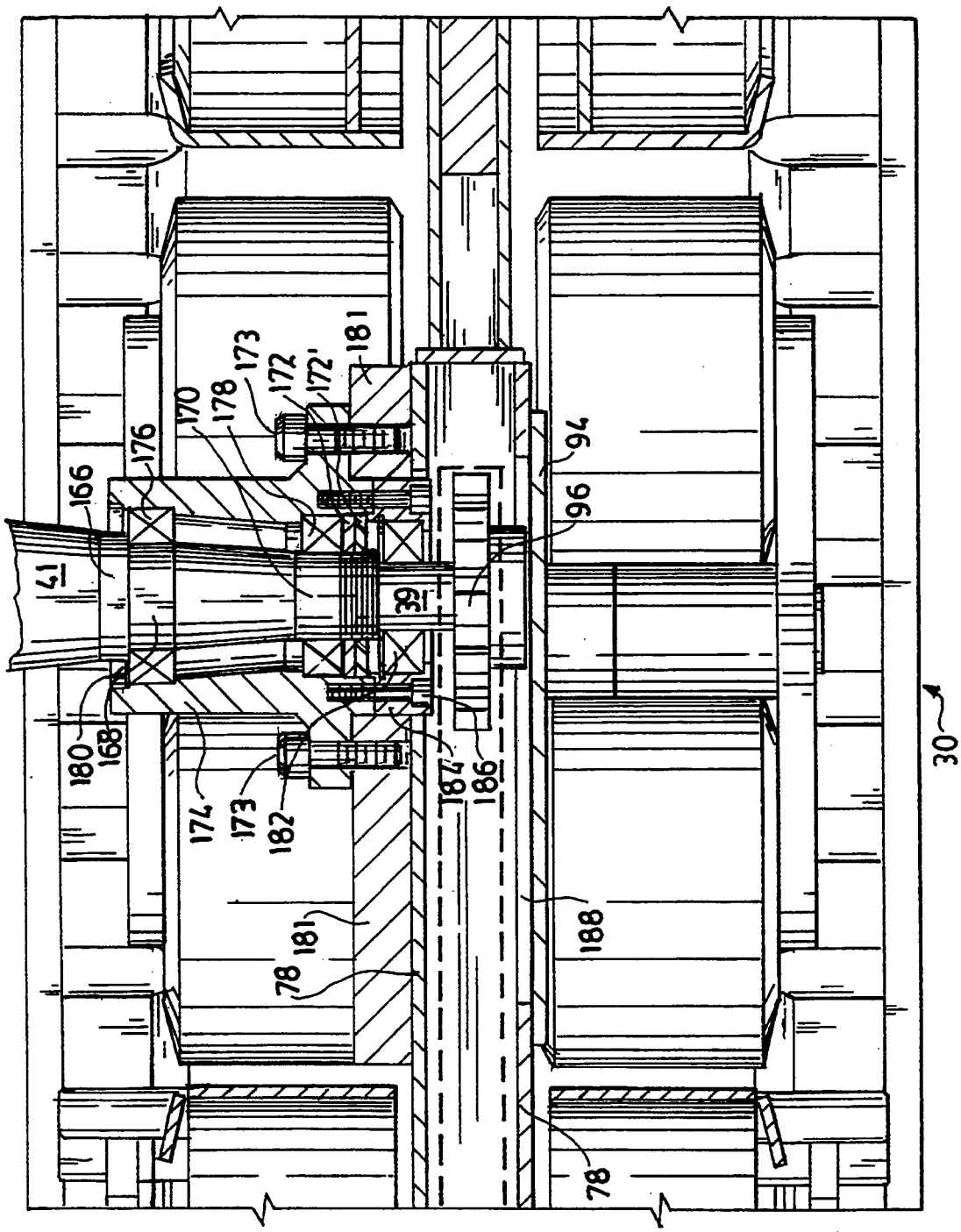
FIG. 9 is a view like FIG. 7, enlarged to show in greater detail the middle portion of the unit of FIG. 7, including the drive sprocket and mount on which the unit can rotate.

FIG. 9 shows the arrangement of elements by which power unit 30 is attached to differential 36 (not shown). Shaft sleeve 41 comprises sealing land 166, inner bearing land 168, and outer bearing land 170. Sleeve 41 is threaded at its outer end to accept retainer nut 172 and locking nut 172'. Hub 174 containing inner bearing 176, outer bearing 178, and sleeve seal 180 is fitted to sleeve 41 and secured by nuts 172 and 172'. After power unit 30 is properly aligned with differential 36, hub 174 is secured to thrust plate 181 on housing 78. This is the only structural connection of power unit 30 to vehicle 10. Its design and location at substantially the longitudinal center of power unit 30 permits unit 30 to oscillate freely about sleeve 41 in response to variations in terrain.

Differential power output shaft 39 is adapted to receive shaft bearing 182 in shaft bearing retainer 184, which is secured to hub 174 by bolts 186. These bolts are accessible through access opening 188 in housing 78. Transmission drive sprocket 96 also is fitted and secured to the end of drive shaft 39 through opening 188.

Figure 10:
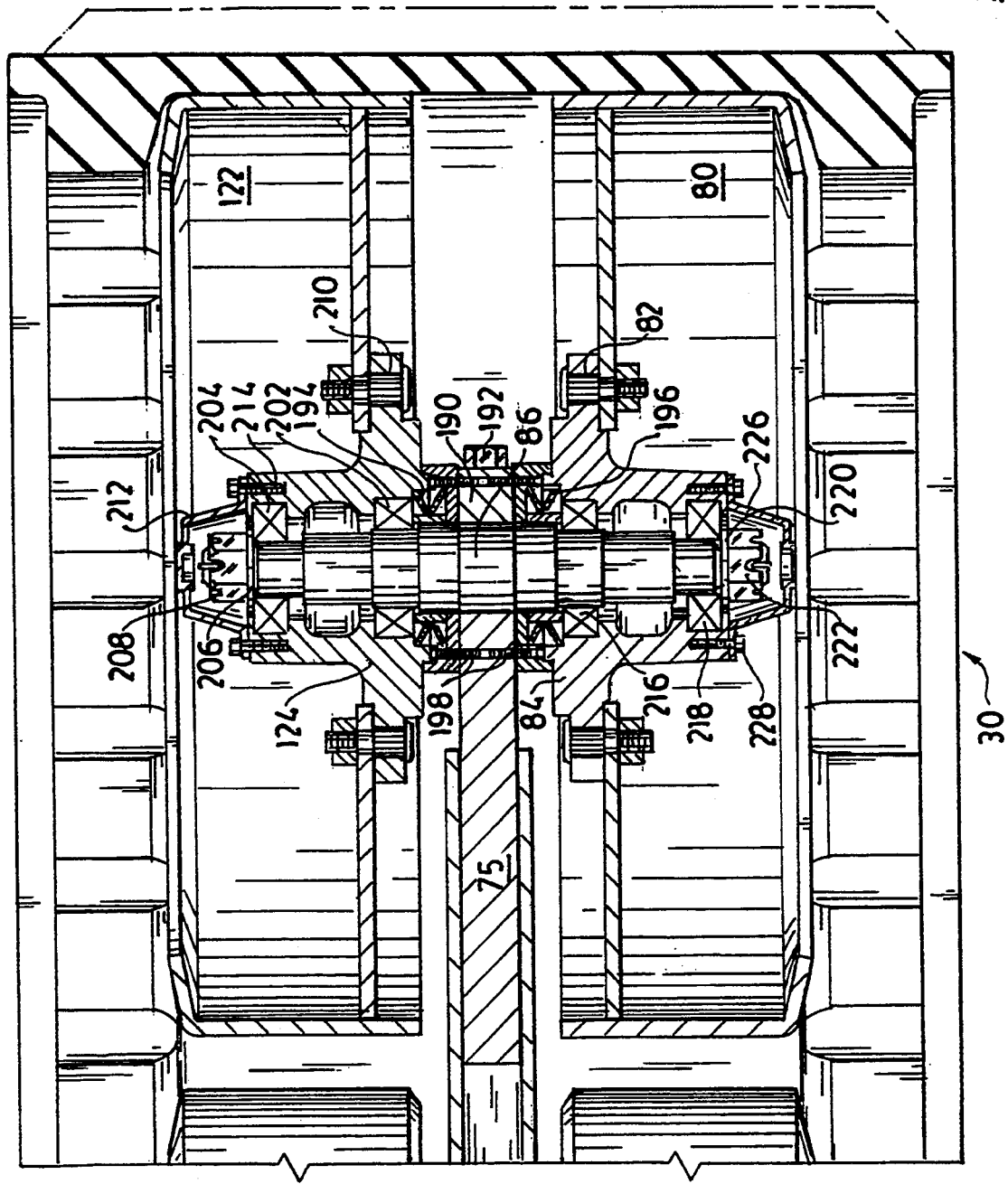
FIG. 10 is a view like FIG. 7, enlarged to show the front of the unit, including the arrangement of idler wheels, in greater detail than in FIG. 7.

FIG. 10 shows the arrangement of bearings and seals whereby outer and inner idler wheels 80 and 122 are mounted on idler axle 86. When assembly is complete, all bearing surfaces are sealed from external contamination. Axle 86 is secured to telescoping structural member 75 by clamp 190 and bolts 192, as is also shown isometrically in FIG. 6. Inner and outer environmental seals 194 and 196 are fitted to axle 86 on opposite sides of member 75 and secured by bolts 198. Inner idler wheel hub 124 adapted as a bearing retainer for first and second inner idler wheel bearings 202 and 204 is fitted to axle 86 and secured by thrust washer 206 and castellated axle nut 208 which is torque-loaded and pinned on the threaded inner end of axle 86. Inner idler wheel 122 is secured to hub 124 by bolts 210. Protective cap 212 is placed over nut 208 and secured to hub 124 by bolts 214.

Similarly, outer idler hub 84 containing first and second outer idler wheel bearings 216 and 218 is fitted to axle 86 and secured by thrust washer 220 and castellated axle nut 222 which is torque-loaded and pinned on the threaded outer end of axle 86. Outer idler wheel 80 is secured to hub 84 by bolts 82. Protective cap 226 is placed over nut 222 and secured to hub 84 by bolts 228.

Figure 11:
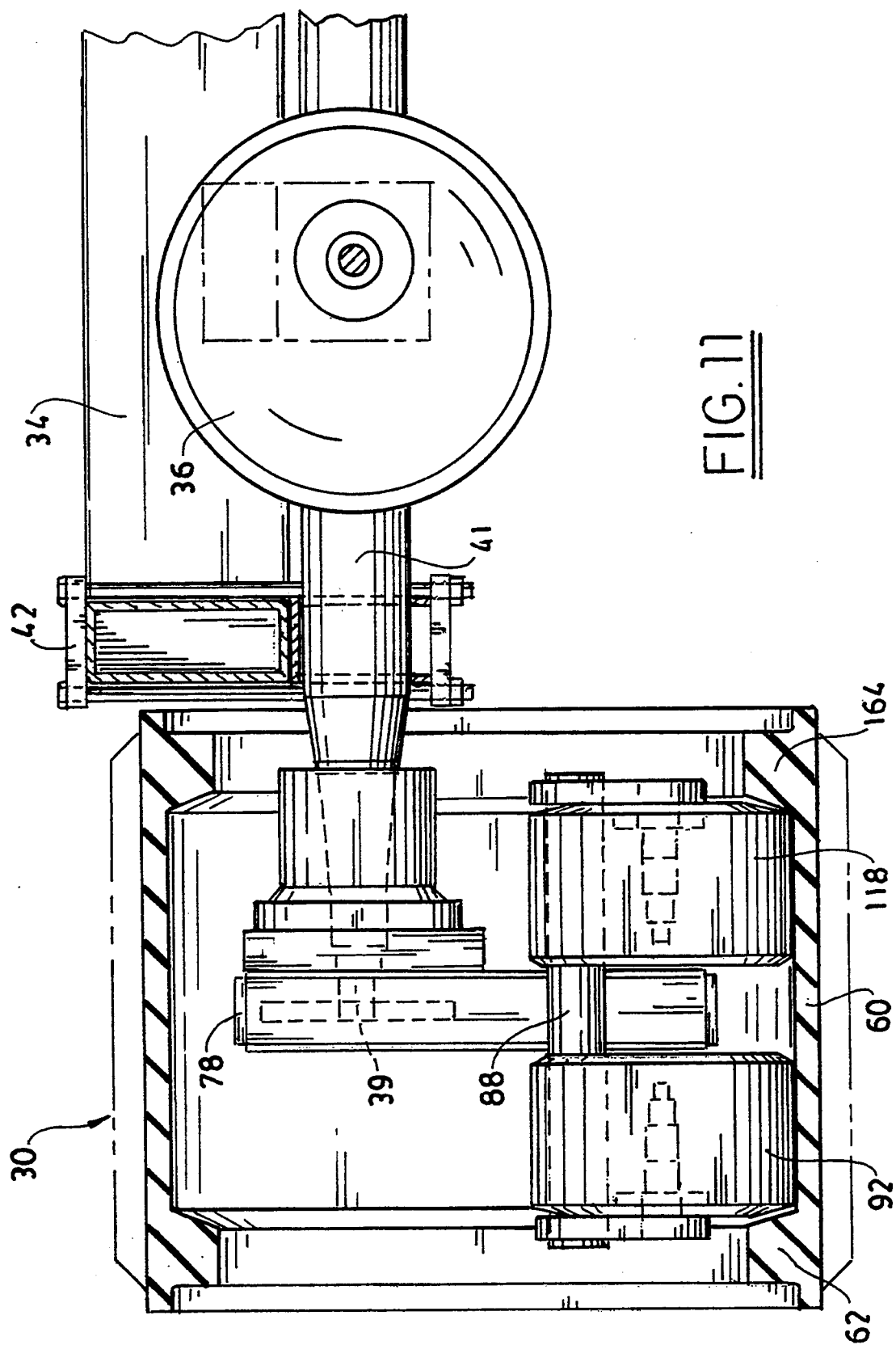
FIG. 11 is a sectional view taken along line 11—11 in FIG. 7.
Figure 12:
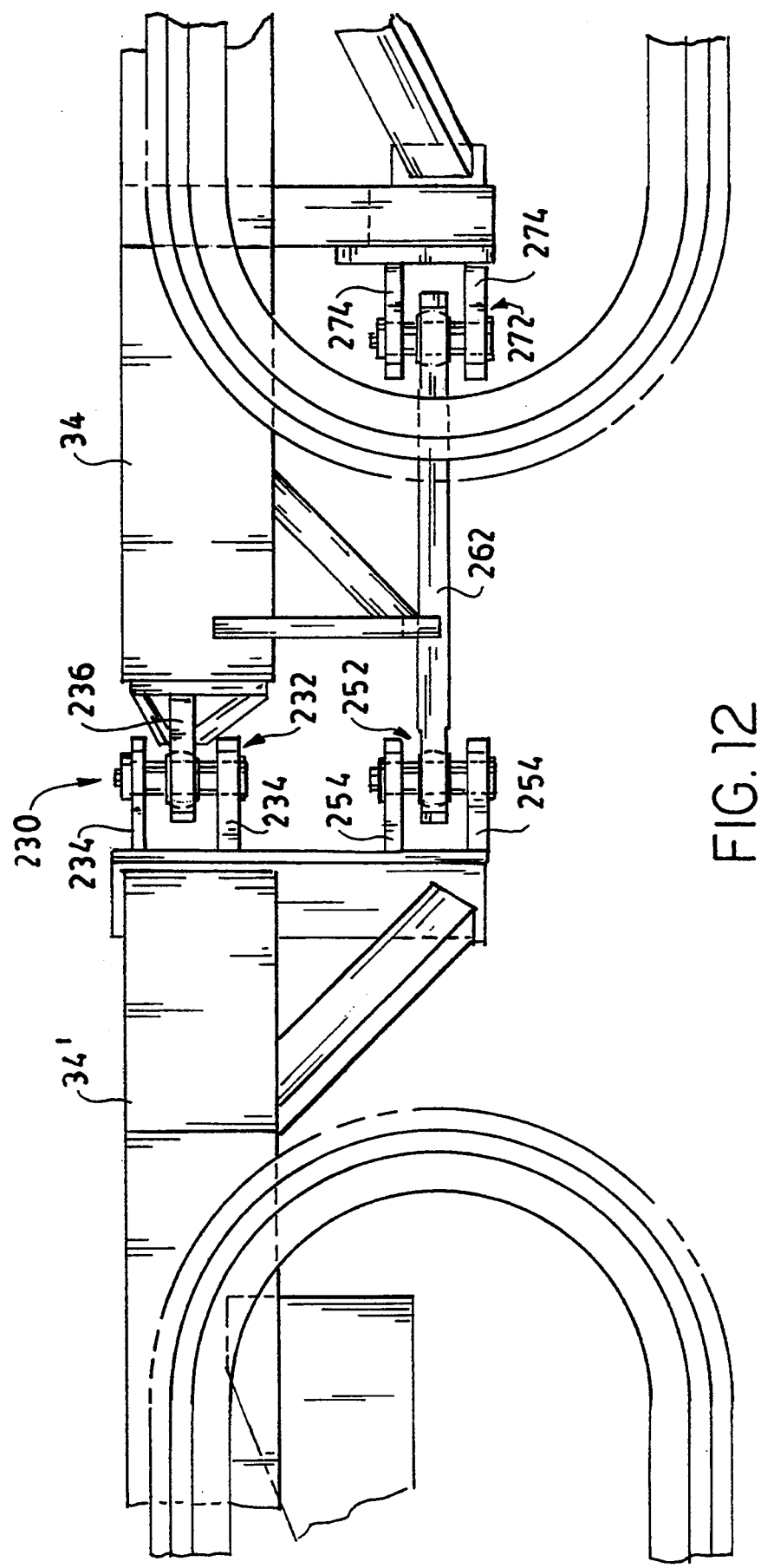
FIG. 12 is an enlarged side elevation of the central area of FIG. 1, showing details of the articulating joint.

FIG. 11 shows the mechanical relationship of differential 36, chassis 34, and power unit 30. Sleeve 41 of differential right side power output shaft 39 is rigidly secured to chassis 34 by means of clamp 42. The differential is also similarly secured to the left side of the chassis (not shown) such that there can be no relative motion between the differential and the chassis. Power unit 30 is disposed on the ends of sleeve 41 and shaft 39 as previously described regarding FIG. 9.

FIG. 11 also shows the disposition of inner and outer bogie wheels 118 and 92 on bogie axle 88 symmetrically about housing 78 in power unit 30, and the vertical and lateral support afforded power unit 30 by the action of both bogie assemblies between the two rows of lugs 62 and 164 on endless track 60.

What is claimed is:
1. A power unit for a tracked vehicle comprising:
   a) a housing capable of supporting said unit and disposed longitudinally in said unit comprising
      i) a first lateral bore near a first end of said housing,
      ii) a first fixed axle laterally disposed on said housing near a second end thereof, and extending beyond opposite sides of said housing,
      iii) a second lateral bore at a longitudinally central location of said unit;
      iv) a second fixed axle laterally disposed on an underside of said housing at a longitudinally central location of said unit, and extending laterally beyond the sides of said housing;
   b) a rotatable axle disposed in said first lateral bore and extending beyond said opposite sides of said housing;
   c) a chain drive transmission disposed within said housing comprising
      i) a drive sprocket, the axis of rotation of which is disposed on the centerline of said second lateral bore,
      ii) a driven sprocket fixed on said rotatable axle, and
      iii) a drive chain operationally connecting said drive sprocket and said driven sprocket;
   d) first and second toothed drive wheels coaxially disposed and fixed on said rotatable axle on opposite sides of said housing;
   e) first and second idler wheels disposed on said first fixed axle on opposite sides of said housing; and
   f) an endless track disposed with an inner surface there in contact with said toothed drive wheels and said idler wheels, and having lugs formed on a portion of said inner surface, said lugs being spaced to mesh with said toothed drive wheels, whereby said endless track is caused to rotate in response to power applied to said power shaft.

2. A power unit of claim 1 wherein said chain drive transmission is disposed on substantially the longitudinal centerline of said power unit.

3. A power unit of claim 1 further comprising first and second bogies disposed on said second fixed axle on opposite sides of said housing.

4. A power unit of claim 1 wherein said endless track comprises an elastomeric material.

5. A power unit of claim 4 wherein said elastomeric material comprises rubber or plastic.

6. A power unit of claim 1 further comprising means for establishing and maintaining tension in said endless track.

7. A power unit of claim 1 wherein said housing provides a sealed container for an oil bath for said chain drive transmission.

8. A power unit of claim 1 wherein said lugs on said inner surface of said endless track are disposed in first and second rows, one row along each edge of said inner surface, wherein said lugs are engaged by said first and second toothed drive wheels, respectively.

9. A power unit of claim 1 wherein each of said first and second toothed drive wheels comprises:
   a) a hub disposed on and fixed to said rotatable axle;
   b) a track drive sprocket having teeth and valleys and disposed coaxially on said hub;
   c) a driven road wheel having outwardly flared, separated, inwardly-directed radial flanges on an inner surface thereof, said driven road wheel being in operational contact with the inner surface of said track and disposed inboard of said track lugs; and
   d) bars affixed on and transversely to each of said teeth and between each of said radial flanges of said driven road wheel whereby said road wheel is affixed to said track drive sprocket, the spacing of said teeth and said lugs being chosen to cause said teeth and bars to mesh with said lugs on said endless track.

* * * * *